United States Patent [19]

Hashimoto et al.

[11] Patent Number: 5,339,513
[45] Date of Patent: Aug. 23, 1994

[54] METHOD OF MANUFACTURING THICK-WALLED SMALL DIAMETER PIPE

[75] Inventors: Yasuaki Hashimoto, Tagata; Tadahiro Uematsu, Numazu, both of Japan

[73] Assignee: Usui Kokusai Sangyo Kaisha Ltd., Japan

[21] Appl. No.: 985,188

[22] Filed: Nov. 30, 1992

[30] Foreign Application Priority Data

Dec. 2, 1991 [JP] Japan .................. 3-343903

[51] Int. Cl.⁵ .............. B23P 15/00; B24B 1/00; B24B 5/40
[52] U.S. Cl. .................. 29/526.6; 29/527.6; 51/34 H; 51/48 R; 51/290; 82/1.11; 408/53; 409/244
[58] Field of Search .......... 82/1.11, 129, 131, 113, 82/124; 408/53, 62, 69, 705; 409/244, 257, 265–270, 275, 277, 280–285; 72/70, 340, 341, 203, 275; 51/34 H, 48 R, 67, 290; 29/526.6, 527.6

[56] References Cited

U.S. PATENT DOCUMENTS

| | | | |
|---|---|---|---|
| 1,532,107 | 3/1925 | Ferris | 409/276 |
| 2,183,861 | 12/1939 | Cotter, Sr. | 72/275 |
| 2,315,476 | 3/1943 | Groene | 409/275 |
| 3,046,846 | 7/1962 | Bonnafe | 409/265 |
| 3,517,536 | 6/1970 | Fitzmaurice | 72/275 |
| 3,824,738 | 7/1974 | Hall et al. | 51/290 |
| 4,531,868 | 7/1985 | Gabriele | 409/244 |
| 4,573,841 | 3/1986 | Petkov et al. | 409/244 |
| 5,062,187 | 11/1991 | Bromley | 51/290 |

FOREIGN PATENT DOCUMENTS

| | | | |
|---|---|---|---|
| 123604 | 5/1988 | Japan | 409/282 |
| 111907 | 4/1992 | Japan | 72/70 |
| 772755 | 11/1980 | U.S.S.R. | 409/244 |
| 891261 | 12/1981 | U.S.S.R. | 409/283 |

Primary Examiner—William E. Terrell
Attorney, Agent, or Firm—Anthony J. Casella; Gerald E. Hespos

[57] ABSTRACT

A method of manufacturing a thick-walled small diameter pipe by repeating a process comprising a pipe extension process and a heating process on a pipe to be processed plural times, wherein a machining process on the inner circumferential surface of said pipe to be processed is performed prior to the pipe extension process in the final cycle of said process or a process near the final cycle to remove a black skin layer, cracks and puckers, providing smooth inner surface and excellent proof pressure.

8 Claims, 4 Drawing Sheets

METHOD OF MANUFACTURING THICK-WALLED SMALL DIAMETER PIPE

BACKGROUND OF THE INVENTION

1. Field of the Invention

The present invention relates to a method of manufacturing a thick-walled small diameter pipe and more particularly to a method of manufacturing a high quality thick-walled small diameter pipe which eliminates microscopic cracks which are otherwise produced on the inner circumferential surface of the pipe during pipe extension process.

2. Description of the Prior Art

A thick-walled small diameter pipe used for a fuel injection pipe of a diesel engine must have a smooth inner surface to reduce the resistance inside the pipe and to prevent the clogging at the injection nozzle. In addition, it is required that defects especially microscopic cracks on the inner circumferential surface of the pipe are reduced in order for the pipe to be able to withstand repetitive fatigue under high pressures.

This type of thick-walled small diameter pipe is made through a cold drawing process comprising repetitive pipe extension processes and heating processes performed on a pipe to be processed (original carbon steel pipe). The pipe to be processed has a black skin layer including cracks and concave puckers thereon because it is a seamless pipe and made through a cold drawing process. In this case, even if a process for removing the black skin layer is performed on the pipe to be processed using chemical means such as an acidic liquid, it is difficult to completely remove the black skin layer to modify the inner circumferential surface of the pipe to be processed into a uniform steel skin surface and the black skin layer often remains.

This can result in clogging of the nozzle due to a part of the black skin layer that peels off when such a pipe is used as a fuel injection pipe for a diesel engine.

The applicant has proposed in examined Japanese patent publication No. 51-21391 a method of manufacturing a thick-walled small diameter carbon steel pipe wherein, in forming a pipe to be processed into a thick-walled small diameter pipe, a black skin layer on the inner circumferential surface of the pipe to be processed is removed in advance (hereinafter referred to as initial internal machining) by a mechanical means (mechanical cutting or grinding) to modify the entire surface inside the pipe into a steel skin. The proposed method makes it possible to obtain a thick-walled small diameter carbon steel pipe having an inner circumferential surface which is highly smooth and excellent in circularity and uniformity and which has substantially no black skin layer on the inner surface thereof.

With the initial internal machining method according to the above-described proposal, it is possible to remove almost all the black skin layer, impurities, puckers and flaws that are left on an inner circumferential surface of a pipe to be processed which is manufactured through a hot rolling process. However, if the pipe to be processed is very uneven in thickness and is very eccentric, some of such defects may remain and, in addition, it is not possible to eliminate, during the manufacturing method for a thick-walled small diameter pipe, the defects which are newly introduced during a subsequent pipe extension process performed on the pipe to be processed.

In the manufacture of this type of thick-walled small diameter pipe, concave puckers are produced on the inner circumferential surface of a pipe to be processed during a pipe extension process conducted on the pipe to be processed after initial internal machining. The puckers then close and change to microscopic cracks. Even if the black skin layer is removed using the internal machining according to the above proposed method, cracks of sizes up to 8 $\mu$m may be produced (FIG. 6 shows a crack of 74 $\mu$m as an example.). If the above-described initial machining is not carried out, cracks of sizes up to 300 $\mu$m may be produced (FIG. 6 shows a crack of 135 $\mu$m as an example.). Further, pipes to be processed are frequently uneven in thickness and eccentric because they are manufactured through a hot rolling process Such pipes to be processed have been cut in a manner such as represented by gun drill process which is one of the methods of deep hole processing wherein a cutting tool is pushed into a pipe to be processed fixed on a jig while it is being rotated. (This process uses a tool referred to as gun drill which is aimed at obtaining the linearity of a hole, and this technique has been used in order to prevent the hole processed from becoming eccentric and curving.) Since the cutting is carried out while pushing the tool, great cutting resistance is exerted on the tool and the process can not be continued due to the deflection of an arbor caused by the pushing force unless the thickness of the arbor is increased. When a thick arbor is used to improve rigidity, the tool may advance straight without copying the inner circumferential surface of a pipe to be processed which is eccentric due to uneven thickness. In this case, a black skin layer may remain uncut even if a tool thicker than the inner diameter is used.

SUMMARY OF THE INVENTION

The present invention has been conceived considering the above-described situation regarding this type of thick-walled small diameter pipe. It is an object of the present invention to provide a method of manufacturing a thick-walled small diameter pipe wherein a black skin layer produced during hot rolling is completely eliminated even for a pipe to be processed which is uneven in thickness and is eccentric; even if microscopic cracks are produced during a pipe extension process after initial internal machining, they are reliably removed; and a pipe having an inner circumferential surface of high quality which is especially excellent in proof pressure against repetitive internal pressure.

In order to achieve the above-described object, the method of manufacturing a thick-walled small diameter pipe according to the present invention adds, to a method of manufacturing a thick-walled small diameter pipe wherein a process comprising a pipe extension process and a heating process is repeated plural times on a pipe to be processed, a cutting process on an inner circumferential surface of said pipe to be processed.

When a process including a pipe extension process and a heating process is repeated plural times on a pipe to be processed preferably after initial internal machining to manufacture a pipe having desired inner and outer diameters, according to the method of manufacturing a thick-walled small diameter pipe of the present invention, a core bar having a cutting blade on one end thereof, for example, is moved inside the pipe to be processed by pulling it relative to the pipe to be processed and the pipe to be processed and the core metal are brought into relative rotation prior to a pipe extension process at a process stage near the final process stage of making the pipe diameter small. As a result, even if the pipe to be processed is uneven in thickness and is eccentric, a cutting process copying the inner circumferential surface is performed to completely remove a black skin layer produced during a hot rolling process. In addition, even if microscopic cracks, concave puckers and the like are newly produced in a pipe extension process prior to said cutting process, such defects can be eliminated. In this case, since the pipe diameter has become small when it has come close to the final pipe extension process stage and the pipe is being processed through a pulling process, no large cutting resistance is applied to the core bar and only cutting torque and thrust force produced by the pulling are exerted. Therefore, it is possible to use a core bar having a small diameter which is less rigid relative to the pipe to be processed and which has a good copying property, and the cutting process is performed under a tensile load. This allows the cutting blade of the small diameter core bar to perform cutting process copying the inner circumferential surface even if the pipe to be processed which is uneven in thickness and is eccentric, thereby removing the black skin layer completely.

Further, if a pipe to be processed is fixed and a core bar is rotated during the cutting process, a long core bar undergoes self-excited vibration increasing the roughness of the surface processed. However, by rotating the pipe to be processed instead of rotating the core bar, it is possible to prevent the self-excited vibration of the core bar, stabilizing the processing and reducing the roughness of the surface processed.

Thus, pipe extension and heating processes are performed on the pipe to be processed which has been machined on the inner circumferential surface thereof, and there is produced a thick-walled small diameter pipe which is of high quality and is excellent in proof pressure against repetitive internal pressure.

DETAILED DESCRIPTION OF PREFERRED EMBODIMENTS

An embodiment of the present invention will now be described with reference to the accompanying drawings.

In a first embodiment, a carbon steel pipe of JIS G 3455 STS 370 having an outer diameter of 34 mm and a thickness of 4.5 mm which is a hot-drawn material was used as a pipe to be processed. First, pickling was performed at a temperature of 60 degrees C for 30 to 60 minutes in a 20 percent sulfuric acid solution to remove scales on the inner and outer surfaces and, thereafter, water washing and neutralizing process using a caustic soda aqueous solution was performed.

Next, the pipe to be processed was dipped in a bonderizing liquid (manufactured by Nippon Parkerizing K.K.) to form phosphoric zinc films on the inner and outer surfaces thereof.

Subsequently, the pipe to be processed was swaged to allow the end thereof to be inserted into a drawing die and dipped in lubricating oil. A first pipe extension process was performed to reduce the outer diameter and thickness to 27 mm and 3.7 mm, respectively, using a plug and a die and, thereafter annealing was performed at 800 degrees C for 10 minutes using bright DX gas. A second pipe extension process along with an annealing process was then performed to reduce the outer diameter and thickness to 21 mm and mm, respectively, and, a third pipe extension process along with an annealing process was further performed to reduce the outer diameter and thickness to 15 mm and 3.0 mm, respectively. Further, a fourth pipe extension process was performed to reduce the outer diameter and thickness to 9.5 mm and 2.55 mm, respectively and, thereafter, a leveling process, cutting to a regular size and a chamfering process on one end were performed.

Figure 1:
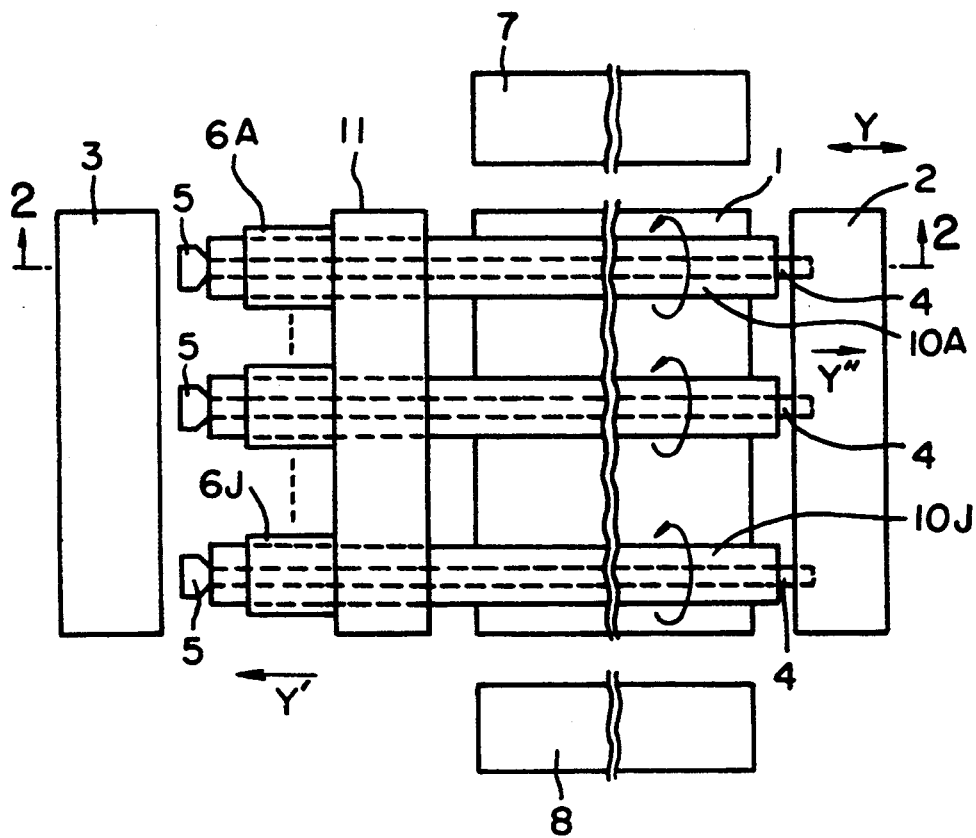
FIG. 1 illustrates an apparatus which embodies a manufacturing method according to an embodiment of the present invention.
Figure 2:
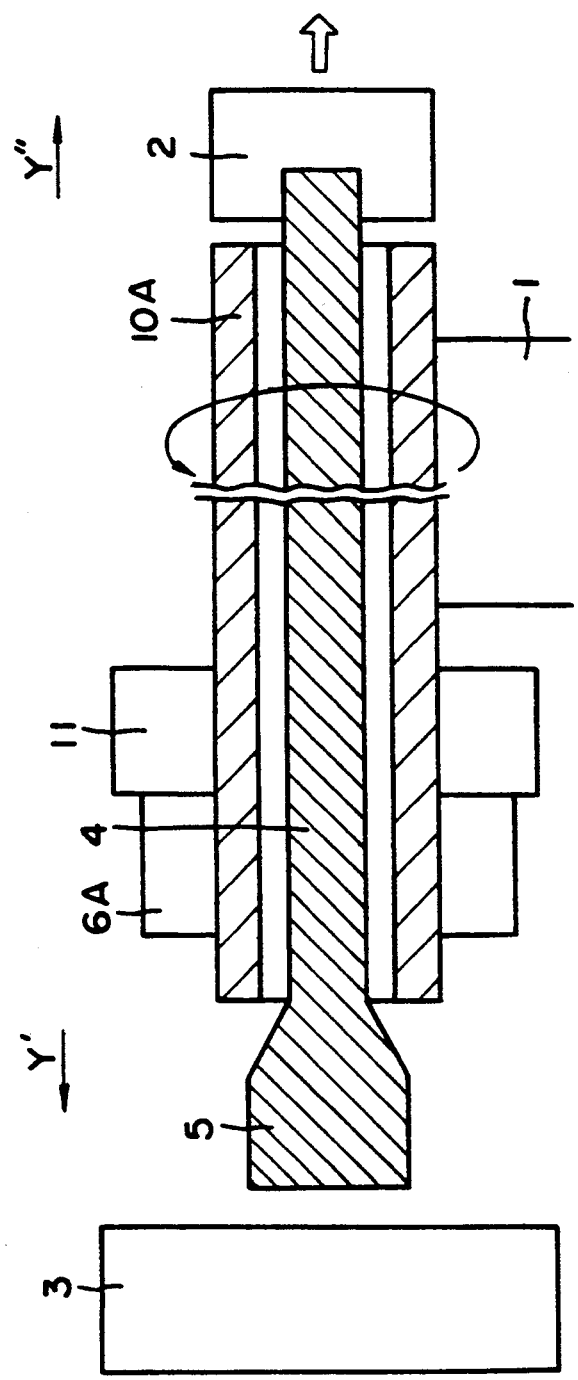
FIG. 2 is a schematic sectional view taken along the line 2—2 in FIG. 1.

Prior to the final pipe extension process, machining process is performed on the inner circumferential surface which is the important portion of the present invention. An apparatus on which this machining process is performed will be described with reference to FIG. 1 and FIG. 2. A holding and moving element 2 and a core bar holding element 3 are mounted to be movable on a base (not shown) in the transport direction indicated by the arrow Y in FIG. 1 so that they sandwich a pipe holding table 1. Each of core bars 4 held by the holding and moving element 2 and core bar holding element 3 has a cutting blade 5 connected to one end thereof.

The core bar holding element 3 is configurated so that it can move the core bars 4 in the axial direction (Y direction) of the core bars 4 while holding and securing the core bars 4 at the side of the ends thereof at which the cutting blades 5 are formed. The holding and moving element 2 is configurated so that it can move the core bars 4 in the axial direction (Y direction) of the core bars 4 while holding and securing the core bars 4 at the side of the other ends thereof. The holding and moving element 2 and core bar holding element 3 is adapted to be able to hold a plurality of (e.g., 10) core bars at a time.

A pipe chuck 11 for engaging and chucking pipes 10A-10J is disposed so that it faces the core bar holding element 3. The pipe chuck 11 has rotating devices 6A-6J provided thereon and is configurated so that it rotates the pipes about their axes.

A pipe supplier 7 is provided at one side of the pipe holding table 1 and a product receiving table 8 is provided at the other side thereof. The pipe holding table 1, holding and moving element 2, core bar holding element pipe supplier 7, product receiving table 8 and pipe chuck 11 to which the rotating devices 6A-6J are connected are configurated so that they will operate in accordance with control signals from a control circuit (not shown).

The operation will now be described. The holding and moving element 2 which holds and secures the core bars 4 at the ends thereof opposite to the cutting blades 5 moves toward the pipe holding table 1, and the side of the core bars 4 at which the cutting blades 5 are located penetrates through the pipe chuck 11 and is held and secured to the core bar holding element 3.

Next, the core bar holding element 3 which holds and secures the side of the core bars 4 at which the cutting blades 5 are located, and the pipe chuck having the rotating devices 6A-6J connected thereto move away from the pipe holding table 1. Then, pipes to be processed 10A-10J having an outer diameter 9.5 mm and a thickness of 2.55 mm are supplied from the pipe supplier 7 to the pipe holding table 1, and a chamfered end of each pipe is disposed in a position facing the end of a core bar 4 held and secured to the core bar holding element 3. The core bar holding element 3, pipe chuck 11, and rotating devices 6A-6J move toward the pipe holding table 1 and, as a result, the core bars 4 are inserted into the pipes to be processed 10A-10J; at the same time, the pipe chuck 11 along with the rotating devices 6A-6J externally fits the pipes to be processed 10A-10J producing a state wherein the pipes to be processed 10A-10J are inserted through the pipe chuck 11; the parts of the cutting blades 5 held by the core bar holding element 3 project from the ends of the respective pipes to be processed 10A-10J; and the core bars 4 penetrates through the respective pipes to be processed 10A-10J projecting the opposite ends at the side of the holding and moving element 2.

Next, the holding and moving element 2 moves in a direction Y'; the ends of the core bars 4 projecting from the opposite ends of the pipes to be processed 10A-10J are held and secured by the holding and moving element 2; the side of the core bars at which the cutting blades 5 are located is released from the state wherein it is held and secured by the core bar holding element 3; and the core bar holding element 3 slightly moves in Y' direction resulting in a state wherein cutting process on the inner circumferential surface is started. Then, the pipes to be processed 10A-10J are chucked by the pipe chuck 11 and the rotating devices 6A-6J are driven to rotate, causing the pipes to be processed to be rotated as indicated by the arrow about their axes at a rotational speed of about 3000 to 4000 rpm.

Then, the holding and moving element 2 moves in a direction Y" away from the pipe holding table 1 at a speed of about 100 to 300 mm/min. Thus the cutting blades 5 which are not rotating move in Y" direction while copying the inner circumferential surfaces of the pipes to be processed 10A-10J which are being rotated to perform a machining process on the inner circumferential surfaces of the pipes to be processed 10A-10J with cutting oil supplied. At this time, the machining process is carried out while supplying cutting oil to the portion of the cutting blades 5 via the ends of the pipes and the like so that the edges of the cutting blades 5 are lubricated and cooled and chips are ejected. When the cutting blades 5 on the core bars 4 come out from the pipes to be processed, the machining operation terminates; the rotation of the pipes to be processed is stopped; the pipe chuck 11, along with the core bar holding element, moves in Y' direction until it comes off the ends of the pipes to be processed; and the pipes to be processed 10A-10J are transferred to the product receiving table 8.

Then, after the chips are ejected and the cutting oil is removed, the pipes are annealed and dipped into lubricating oil and the fifth, final process stage is started.

At the fifth process stage, the final pipe extension process is performed to reduce the outer diameter and thickness to 6.4 mm and 2.0 mm, respectively; dimensional inspection is performed after leveling; and cutting to regular size, chamfering, cleaning with triethane, and annealing are carried out to complete the entire process.

Figure 3:
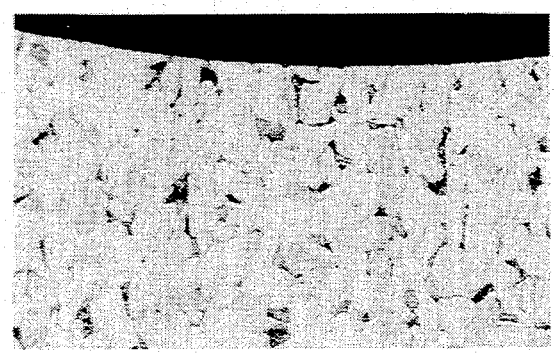
FIG. 3 shows a photograph of the metallographic structure of the inner circumferential surface of a thick-walled small diameter pipe obtained according to a first embodiment of the method of the present invention viewed through a section-magnifying (X200) microscope.

Thus, in the present embodiment, the machining process is performed by copying the inner circumferential surfaces of the pipes to be processed 10A-10J after the fourth process stage in the total five process stages. As a result, even if there is unevenness of thickness or eccentricity, the black skin layer produced in hot rolling is completely removed and concave puckers produced during previous pipe extension process and microscopic cracks of sizes up to 80 $\mu$m resulting from the puckers are eliminated. FIG. 3 shows a microphotograph of the inner circumferential surface of a thick-walled small diameter pipe manufactured in the present invention. As shown, the inner circumferential surface has substantially no microscopic crack and is highly smooth, and a high quality thick-walled small diameter pipe having excellent circularity and uniformity has been obtained.

Next, another example will be described as a second embodiment wherein pipes to be processed undergo total five times of repetitive pipe extension and heating processes and a machining process on the inner circumferential surfaces is performed prior to the fourth process stage using the devices identical to those in the first embodiment.

In this embodiment, the process conditions up to the third process stage were all identical to those in the first embodiment except that a pipe extension process for reducing the thickness to 3.45 mm was performed at the third process stage.

A machining process was performed on the inner circumferential surfaces prior to the fourth pipe extension process, the conditions for this process were identical to those in the first embodiment except that the rotational speed of the pipes to be processed was about 2000 to 3000 rpm.

The chips inside the resultant pipes to be processed were removed and, after cleaning with triethane and annealing, the fourth pipe extension process was performed to reduce the outer diameter and thickness to 9.5 mm and 2.75 mm, respectively. Then, swaging and annealing were performed and, after leveling and chamfering, the pipes were transferred to the fifth, final process stage.

At the fifth process stage, the final pipe extension process was performed to reduce the outer diameter and thickness to 6.4 mm and 2.2 mm, respectively. The subsequent processes were indentical to those in the first embodiment.

Figure 4:
FIG. 4 shows a photograph of the metallographic structure of a second embodiment viewed through a microscope similar to that foe FIG. 3.
Figure 5:
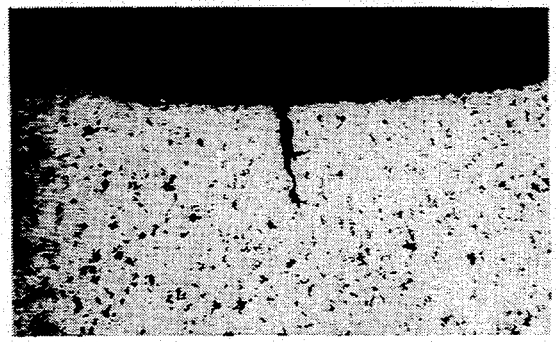
FIG. 5 shows a photograph of the metallographic structure of an example of a thick-walled small diameter pipe according to the prior art viewed through a microscope similar to that for FIG. 3.
Figure 6:
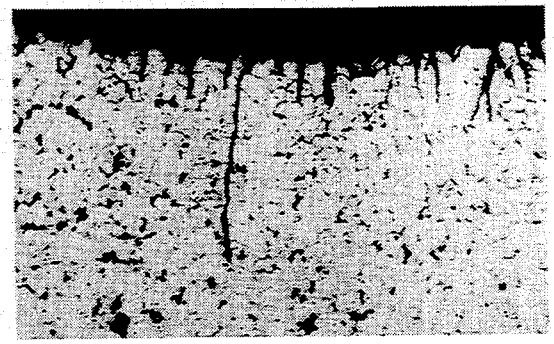
FIG. 6 is a photograph of the metallographic structure showing another example of the prior art viewed through a microscope similar to that for FIG. 3.

FIG. 4 shows a microphotograph of the inner circumferential surface of a resultant thick-walled small diameter pipe wherein the black skin layer produced during hot rolling has been completely eliminated by the machining process copying the inner circumferential surface; concave puckers produced during the pipe extension process has been eliminated and the state of microscopic cracks of sizes up to 80 $\mu$m resulting from the puckers has been substantially improved to a maximum size of 30 $\mu$m, resulting in high smoothness; and excellent circularity and uniformity have been achieved.

An example will be described as a third embodiment wherein the machining process on the inner circumferential surface of a pipe to be processed was performed through broaching using a broaching machine.

In the third embodiment, the processes up to the second process stage were all identical to those in the first embodiment just as in the second embodiment except that the third pipe extension process was performed to reduce the outer diameter and thickness to 16 mm and 3.1 mm, respectively.

In performing a machining process on the inner circumferential surface of the pipe to be processed extended as previously-described, the third embodiment uses a broaching machine having 8 to 10 blades, a quantity of cut of 0.1 mm, and a length of about 600 mm to perform broaching at a cutting speed of 150 to 200 mm/sec. under forced-feed lubrication and second broaching for a quantity of cut of 0.1 mm with other conditions kept substantially unchanged.

The pipe which has received these two broaching processes to provide a machining process copying the inner circumferential surface, is then processed and treated in a manner similar to that in the second embodiment to obtain a thick-walled small diameter pipe having desired characteristics.

Inclusion of the initial machining in the first, second or third embodiment will allow more effective removal of the microscopic cracks and black skin layer produced during hot rolling. Although the above-described embodiments are illustrative of pipe processing by means of cutting, the present invention is not limited to such cutting process and the inner circumferential surface of a pipe to be processed may be processed using a grinding process. In this case, in addition to rotating the pipe to be processed, a grinding tool is preferably rotated in the direction opposite to the direction in which the pipe to be processed is rotated, to improve the relative grinding speed.

Further, although the above-described embodiments are illustrative of an example wherein a core bar which does rotate is moved so that it copies the inner circumferential surface of a pipe to processed which is being rotated, the core bar may be fixed instead of being moved with the pipe to be processed rotated and simultaneously moved. Alternatively, both of them may be moved in relative directions to put the core bar in a state wherein it is pulled relative to the pipe to be processed. Thus, it is possible to use a core bar which is thin, low in rigidity, and which easily copy the inner circumferential surface to follow it. If the pipe to be processed is short, the pipe to be processed may be kept stationary with the core bar rotated.

Although the above-described embodiments are illustrative of the manufacture of a thick-walled small diameter pipe having an outer diameter of 6.4 mm and a thickness of 2.0 to 2.2 mm used as a fuel injection pipe for a diesel engine of an automobile, thick-walled small diameter pipe of other sizes may be manufactured such as one having an outer diameter of 6 to 15 mm and a thickness of 1.8 to 5.5 mm to be used for a diesel engine for a construction machine, vessel, or the like.

The above-described embodiments provide a high-quality thick-walled small diameter pipe wherein microscopic cracks have been reduced at least to a maximum size of about 30 $\mu$m; notch sensitivity has become low relative to the internal pressure; and proof pressure against repetitive internal pressure has been increased up to 1500 Kgf/cm$^2$.

As described above in detail, according to the present invention, a machining process is performed by copying the inner circumferential surface of a pipe to be processed prior to the pipe extension process near the final stage of the process comprising repeated extension and heating processes performed on a pipe to be processed. Therefore, it is possible to provide a method for obtaining a thick-walled small diameter pipe wherein a black skin layer produced during hot rolling is completely eliminated even for a pipe to be processed which is uneven in thickness and is eccentric; microscopic cracks on the inner circumferential surface are reduced; the smoothness of the inner circumferential surface is improved; circularity and uniformity are excellent; a high level of pressure withstanding property and high quality are achieved; and proof pressure against internal pressure is especially improved.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A method for machining at least one thick-walled small diameter pipe that has been manufactured by extension and heating processes, said pipe having a longitudinal axis and an inner circumferential surface approximately concentric with the longitudinal axis, said method for machining said pipe being operative to uniformly cut away portions of the inner circumferential surface of said pipe despite any eccentricity of the inner circumferential surface relative to the longitudinal axis for removing defects and achieving smoothness in said pipe, said method comprising the steps of:

providing a core bar having opposed first and second ends, a cutting tool being disposed on said first end thereof, portions of the core bar spaced from the cutting tool on the first end being dimensioned to fit into the pipe;

holding the core bar in proximity to the first end thereof;

inserting the second end of the core bar into and through the pipe;

holding the second end of the core bar;

releasing the first end of the core bar;

rotating the pipe about the longitudinal axis;

generating relative longitudinal movement between the pipe and the core bar such that the cutting tool of the core bar follows the inner circumferential surface through the pipe and uniformly cuts away the inner circumferential surface of the pipe.

2. A method as in claim 1 wherein the relative longitudinal movement between the core bar and the pipe is achieved by moving the core bar while holding the pipe in a fixed longitudinal position.

3. A method as in claim 1 wherein the relative longitudinal movement between the core bar and the pipe is achieved by moving the pipe longitudinally relative to the core bar.

4. A method as in claim 1 wherein the core bar is less rigid than the pipe such that the core bar follows the inner circumferential surface of the pipe despite any eccentricities of the inner circumferential surface relative to the longitudinal axis of the pipe.

5. A method as in claim 1 wherein the cutting tool is a grinder, and wherein the process further comprises the step of rotating the core bar in a direction opposite to the rotation of the pipe for increasing relative rotational speed between the pipe and the grinder.

6. A method as in claim 1 further comprising the step of mounting the pipe in a rotatable mechanism prior to inserting the core bar into the pipe.

7. A method as in claim 6 further comprising the step of removing the pipe from the rotatable holding mechanism after completing the relative longitudinal movement between the pipe and the core bar, engaging the first end of the core bar and releasing the second end of the core bar so that the second end of the core bar can be inserted into a subsequent pipe to processed.

8. A method as in claim 1 wherein said at least one pipe comprises a plurality of pipes and wherein the step of providing a core bar comprises providing a core bar for each said pipe.

* * * * *